United States Patent [19]

Senjo et al.

[11] 4,029,739
[45] June 14, 1977

[54] PROCESS FOR REMOVING NITROGEN OXIDES FROM WASTE GAS

[75] Inventors: Teizo Senjo, Machida; Makio Kobayashi, Toyonaka, both of Japan

[73] Assignees: Fuji Kasui Engineering Co., Ltd., Tokyo; Sumitomo Metal Industries, Ltd., Osaka, both of Japan

[22] Filed: Dec. 30, 1975

[21] Appl. No.: 645,350

[30] Foreign Application Priority Data

Jan. 6, 1975 Japan .............................. 50-000009

[52] U.S. Cl. .............................. 423/235; 423/351; 423/512 R
[51] Int. Cl.$^2$ ........................................ C01B 21/00
[58] Field of Search .......... 423/235, 239, 351, 243, 423/512

[56] References Cited

UNITED STATES PATENTS

| 3,615,199 | 10/1971 | Terrana et al. | 423/242 |
| 3,843,771 | 10/1974 | Urban | 423/242 |
| 3,888,969 | 10/1975 | Kawamoto et al. | 423/243 |
| 3,904,735 | 9/1975 | Atwood et al. | 423/235 |
| 3,932,585 | 1/1976 | Moriguchi et al. | 423/235 |
| 3,957,949 | 5/1976 | Senjo et al. | 423/393 |
| 3,961,018 | 6/1976 | Williamson | 423/235 |

FOREIGN PATENTS OR APPLICATIONS

| 1,272,882 | 11/1960 | France | 423/235 |
| 1,201,864 | 4/1958 | France | 423/235 |
| 1,454,723 | 11/1965 | France | 423/235 |
| 521,031 | 3/1931 | Germany | 423/235 |
| 901,630 | 7/1962 | United Kingdom | 423/235 |

OTHER PUBLICATIONS

Inorganic Chemistry, vol. 1, 1962, pp. 768–770 —*Rxns of NO with Misc. Lewis Bases*, Longhi et al.
Inorganic Syntheses, 1957, Moeller, pp. 117–122, "N–Nitroso–Hydroxyamine–N–Sulfonates."

*Primary Examiner*—O. R. Vertiz
*Assistant Examiner*—Eugene T. Wheelock
*Attorney, Agent, or Firm*—Armstrong, Nikaido & Marmelstein

[57] ABSTRACT

Nitrogen oxides can be efficiently removed from waste gas containing the same by oxidizing nitrogen monoxide into nitrogen dioxide, and then by scrubbing said waste gas with an aqueous scrubbing solution containing (a) a sulfur-containing reducing compound of alkali metals or ammonium such as alkali or ammonium sulfites, thiosulfates, sulfides, polysulfides and hydrosulfites and (b) a catalytic compound such as amino compounds, nitro compounds and oxidation or reduction derivatives thereof.

11 Claims, No Drawings

PROCESS FOR REMOVING NITROGEN OXIDES FROM WASTE GAS

The present invention relates to the removal of nitrogen oxides ($NO_x$) containing nitrogen monoxide (NO) and nitrogen dioxide ($NO_2$) from waste gases containing the same, such as combustion exhaust gases, waste gases from metal dissolving and pickling plants, waste gases from various chemical processes and other industrial waste gases containing nitrogen oxides, and more specifically relates to improvements in a process for removing nitrogen oxides from such waste gases, by oxidizing nitrogen monooxide into nitrogen dioxide first and then by scrubbing said waste gases with an aqueous scrubbing solution containing said sulfur-containing reducing compound of alkali metals or ammonium.

Recently, because of increasing interest in the preservation of the environment, various denitrogenation processes which remove nitrogen oxides from industrial waste gases have been developed. Of these processes, alkali or sulfuric acid absorption processes, oxidation absorption processes, complex-compound formation removing processes, reduction removing processes and the like are well-known in the art as wet processes for removing nitrogen oxides from waste gases.

In the processes of scrubbing nitrogen oxides contained in the waste gas with, for example, water, sodium hydroxide or sulfuric acid, the rate of removal of nitrogen oxides is generally unsatisfactory since the rate of absorption of nitrogen oxides, especially nitrogen monoxide, is very low. In order to increase said rate of removal of nitrogen oxides, some improvements such as controlling the ratio of nitrogen monoxide to nitrogen dioxide to 1:1 or oxidizing nitrogen monoxide contained in nitrogen oxides into nitrogen dioxide or dinitrogen penta oxide, prior to scrubbing the waste gases containing nitrogen oxides have been implemented. However, the rate of removal of nitrogen oxides is still low, and further a large amount of scrubbing solution is required. In the process of scrubbing nitrogen oxides contained in the waste gas with, for example, an aqueous ferrous sulfate solution which absorbs nitrogen oxides which are converted into a complex compound $Fe(NO)SO_4$, it is difficult to prevent said ferrous sulfate from being oxidized by oxygen contained in the gas to be scrubbed.

A reduction process for removing nitrogen oxides from waste gas by reducing said nitrogen oxides with a reducing agent such as sodium sulfite ($Na_2SO_3$), ammonium sulfite (($NH_4)_2SO_3$) and the like is known as a preferable process, but it has the economical problem that a large amount of the reducing agent is wastefully consumed by the auto-oxidation of the sulfite or by the oxidation of said sulfite with oxygen contained in the waste gas to be scrubbed.

That is, the sulfite for reducing nitrogen dioxide is converted into sulfate, which does not reduce nitrogen dioxide. In addition the oxidation reaction of the sulfite with oxygen is accelerated in the presence of nitrogen dioxide, which is a substance to be removed and is inevitablly contained in the waste gas to be scrubbed.

Accordingly, the objects of the present invention are to obviate the afore-mentioned problems of the conventional reduction denitrogenation processes, and to provide an improved reduction denitrogenation process which is capable of removing nitrogen oxides from waste gas with an enhanced efficiency and is also capable of suppressing the oxidation reaction of the reducing agent for denitrogenation, caused by oxygen contained in the waste gases.

Other objects and advantages of the present invention will be apparent from the following description.

In accordance with the present invention, there is provided a process for removing nitrogen oxides including nitrogen monoxide and nitrogen dioxide from waste gas containing the same, comprising the steps of:

a. oxidizing said nitrogen monoxide into nitrogen dioxide by adding an oxidizing agent such as, chlorine dioxide ($ClO_2$), ozone ($O_3$) gas and the like, to the waste gas, and b. scrubbing said waste gas with an aqueous scrubbing solution containing:
  i. at least 0.5% by weight of a sulfur-containing reducing compound of alkali metals or ammonium, and
  ii. at least 500 ppm by weight of at least one catalytic compound selected from the group consisting of amino compounds, nitro compounds and oxidation or reduction derivatives thereof.

According to the present process for removing nitrogen oxides from waste gas, in order to oxidize nitrogen monoxide contained in said waste gas into nitrogen dioxide, an oxidizing agent such as, chlorine dioxide, ozone and the like is first added to the waste gas at, for example, the feeding pipe or duct through which the waste gas to be scrubbed is fed into a scrubbing column. These oxidation reactions may be expressed by the following equations (1), (2) and (2'):

$$2NO + ClO_2 + H_2O \rightarrow NO_2 + HCl + HNO_3 \quad (1)$$
$$NO + O_3 \rightarrow NO_2 + O_2 \quad (2)$$
$$2NO + 3O_3 \rightarrow N_2O_5 + 3O_2 \quad (2')$$

In the preferred embodiment of the present process for removing nitrogen oxides from waste gases, a stoichiometric amount of chlorine dioxide or ozone to nitrogen monoxide is used. That is, when chlorine dioxide is used as the oxidizing agent for nitrogen monoxide, chlorine dioxide is added to the waste gas in such an amount that the mole ratio of chlorine dioxide to nitrogen monoxide is approximately 0.5. On the other hand, when ozone is used, the mole ratio of ozone to nitrogen monoxide is within the range from about 1.0 to about 1.5.

Said waste gas containing nitrogen dioxide is then scrubbed with an aqueous scrubbing solution containing said sulfur-containing reducing compound of alkali-metals or ammonium and at least one catalytic compound selected from the group consisting of amino compounds, nitro compounds and oxidation or reduction derivatives thereof. Thus, nitrogen dioxide contained in the waste gas can be removed from the waste gas by reduction reaction, which may be expressed by the following equations (3) through (7):

$$NO_2 + 2M_2SO_3 \rightarrow \tfrac{1}{2}N_2 + 2M_2SO_4 \quad (3)$$
$$NO_2 + 4M_2S_2O_3 + 2H_2O \rightarrow \tfrac{1}{2}N_2 + 2M_2S_4O_6 + 4MOH \quad (4)$$
$$5NO_2 + 8M_2S_2O_4 + 4MOH \rightarrow 5/2N_2 + 8M_2SO_4 + 2M_2S_4O_6 + 2H_2O \quad (5)$$
$$NO_2 + 4M_2S + 2H_2O \rightarrow \tfrac{1}{2}N_2 + 2M_2S_2O_3 + 4MOH \quad (6)$$
$$NO_2 + 2MHS \rightarrow \tfrac{1}{2}N_2 + 2S + 2MOH \quad (7)$$

wherein M represents alkali metals (Na, K) and ammonium ($NH_4$). This scrubbing operation can be carried out by, for example, countercurrently placing, the waste gas to be scrubbed, into contact with the aqueous scrubbing solution in any conventional scrubbing column.

The sulfur-containing reducing compound to be employed in the present process for removing nitrogen oxides from waste gases includes sulfites of alkali metals or ammonium ($M_2SO_3$), such as sodium sulfite, potassium sulfite and ammonium sulfite; thiosulfates of alkali metals or ammonium ($M_2S_2O_3$), such as sodium thiosulfate, potassium thiosulfate and ammonium thiosulfate; sulfides or polysulfides of alkali metals or ammonium ($M_2S_x$, $x=1,2,3,4 ...$), such as sodium sulfide, potassium sulfide, ammonium sulfide, sodium polysulfides, potassium polysulfides and ammonium polysulfides; hydrosulfites of alkali metals or ammonium ($M_2S_2O_4$), such as sodium hydrosulfite, potassium hydrosulfite and ammonium hydrosulfite; hydrosulfides of alkali metals or ammonium (MHS), such as sodium hydrosulfide, potassium hydrosulfide and ammonium hydrosulfide; hydrogen sulfide ($H_2S$); and any mixture thereof.

The concentration of said sulfur-containing reducing compound in the aqueous scrubbing solution is generally 0.5% by weight or more based on the total weight of the aqueous scrubbing solution, and, preferably, is in a range from 1 to 5% by weight based on the total weight of the aqueous scrubbing solution. When the concentration of said sulfur-containing reducing compound in the aqueous scrubbing solution is less than 0.5% by weight, the stable operation for removing nitrogen oxides from waste gases at a high denitrogenation rate can not be sufficiently accomplished, whereas although the concentration of said sulfur-containing compound can be more than 5% by weight, it is not economical.

The catalytic compound to be employed in the present process for removing nitrogen oxides from waste gases includes amino compounds having a general formula of $R(NH_2)_n$ (wherein R represents substituted or unsubstituted hydrocarbon radical having carbon atoms from 1 to 20, preferably 1 to 10, the substituent may be one or more oxygen-, sulfur- or nitrogen-containing hetero radicals, and $n$ represents a positive integer, especially 1 to 5, preferably 1 to 3) such as methylamine, dimethylamine, trimethylamine, o-aminophenol, p-aminophenol, dinitroaniline, diethylenediamine, triaminophenol, cyclohexylamine and the like; nitro compounds having a general formula, $R(NO_2)_n$ (wherein R and $n$ are the same as defined above), such as, nitroglycerin, o-nitrotoluene, trinitrophenol and the like; oxidation or reduction derivatives thereof, which are produced by the oxidation reaction of said amino compounds or by the reduction reaction of said nitro compounds, such as hydroxylamino compounds, for example, dinitrohydroxyl aminophenol, phenylhydroxylamine, 2-hydroxylamino-1,3-propanediol and the like; nitroso compounds, for example, dinitro nitrosophenol, p-nitroso phenol, 2-nitroso-1,3-propanediol and the like; and any mixture thereof.

Of these compounds, aromatic amino compounds, especially aromatic polyamino compounds having a large number of amino groups such as, for example, triaminophenol is most effective for removing nitrogen oxides from waste gases of a high denitrogenation rate and at a lower consumption of the sulfur-containing reducing agent.

The concentration of said catalytic compound in the aqueous scrubbing solution is generally 500 ppm by weight or more based on the total weight of the scrubbing solution, and preferably is in the range from 1,000 to 5,000 ppm by weight based on the total weight of the scrubbing solution. When the concentration of said catalytic compound in the aqueous scrubbing solution is less than 500 ppm, the stable operation for removing $NO_x$ from waste gases at a high denitrogenation rate and at a lower consumption of the sulfur-containing reducing compound can not be accomplished sufficiently, whereas, although the concentration of said catalytic compound is more than 5000 ppm, it is not economical.

The catalytic compound is excellent for removing nitrogen oxides from waste gases when it is employed with a sulfur-containing reducing compound in the aqueous scrubbing solution. However, used alone, the catalytic is only slightly effective.

The mechanism of the process for removing nitrogen dioxide ($NO_2$) from waste gases according to the present invention will now be explained with regard to a case in which sodium sulfite ($Na_2SO_3$) and amino compound ($RNH_2$) are used in the aqueous scrubbing solution as the sulfur-containing reducing compound and the catalytic compound, respectively.

It is considered that nitrogen dioxide contained in the waste gas to be scrubbed mainly reacts with $RNH_2$ contained in the aqueous scrubbing solution and nitrogen gas ($N_2$) and oxidation products of amine ($R[(NH_2)_n(O_2)_m]$) are formed as shown in the following equation (8):

$$R(NH_2)_n + mNO_2 \rightarrow m/2N_2 + R[(NH_2)_n(O_2)_m] \qquad (8)$$

wherein R and $n$ are the same as defined above and $m$ represents a positive integer.

The oxidation products thus formed are reduced by $Na_2SO_3$ contained in the scrubbing solution as shown in the following equation (9):

$$R[(NH_2)_n(O_2)_m]+2m\ Na_2SO_3 \rightarrow R(NH_2)_n+2m\ Na_2SO_4 \qquad (9)$$

Thus, the amino compound $RNH_2$ is reproduced and the oxidation-reduction reactions (8) and (9) are repeated in the system during the denitrogenation process. Finally, nitrogen dioxide contained in the waste gas is apparently reduced and scrubbed with sodium sulfite in the presence of said catalytic compound.

Said catalytic compound not only facilitates the denitrogenation reaction but also prolongs the life of the sulfur-containing reducing compound in the scrubbing solution. That is, the life of said sulfur-containing reducing compound in the scrubbing solution is remarkably extended by incorporating the catalytic compound into the scrubbing solution, although it is very short in the absence of the catalytic compound, as mentioned before. It is believed that this extension of the life of said sulfur-containing reducing compound is due to the fact that the oxidation thereof with molecular oxygen in the waste gas to be scrubbed is effectively suppressed by the catalytic compound.

The dissolving rate of oxygen contained in air into water is a rate-determining step in the air oxidation reaction of sodium sulfite, and the oxidation yield of sodium sulfite increases linearly with time. When an amino compound $RNH_2$ is dissolved in the aqueous sodium sulfite solution in a concentration of 500 ppm or more, the oxidation yield of sodium sulfite in the solution is one-tenth or less of that of the solution in which no amino compound is dissolved. This means that $RNH_2$ functions both selectively and catalytically in the reaction for removing nitrogen dioxide from gases. When said amino compound ($RNH_2$) and sodium thiosulfate ($Na_2S_2O_3$) are used, a high denitrogenation rate can also be obtained by an oxidation-reduction reaction similar to that in the above case, although the denitrogenation rate is remarkably low when only sodium thiosulfate is used.

Further, when nitro compound ($RNO_2$) is used together with the sulfur-containing reducing compound instead of with the amino compound ($RNH_2$), a high denitrogenation rate can also be obtained. It is believed that the nitro compound is reduced by introducing the sulfur-containing reducing compound, into the corresponding nitroso or hydroxylamino compound, which serves as the catalytic compound for the reduction of nitrogen dioxide.

The following Table shows comparative test results with regard to the life of various absorbing solutions which include the present scrubbing solutions and the conventional scrubbing solutions. The tests were conducted by blowing 2 liter/min of air containing 700–800 ppm by volume of $NO_2$ into 200 ml of absorbing solutions in flasks, as listed in the Table. The rate of denitrogenation was obtained by determining the concentration of the residual nitrogen dioxide in the outlet air from the flask by means of chemical-luminescence type $NO_2$-analyzer (manufactured by Shimadzu Seisakusho Ltd., Japan).

When the denitrogenation rate is at least 90%, the lifetime of the absorbing solution is as is shown in Table.

Table

| Run No. | Component of aqueous absorbing solution | Concentration | Denitrogenation Rate (%) | Lifetime (min.) |
|---|---|---|---|---|
| 1 | $Na_2SO_3$ | 0.4 mol/liter | 96 | 24 |
| 2 | $Na_2S_2O_3$ | 0.4 mol/liter | 41 | — |
| 3 | $(NH_4)_2SO_3$ | 0.4 mol/liter | 96 | 22 |
| 4 | $Na_2S$ | 0.4 mol/liter | 93 | 240 |
| 5 | $Na_2S_2O_3$ O.A.P.*¹ | 0.4 mol/liter 1000 ppm | 90 – 96 | >600 |
| 6 | $Na_2S_2O_3$ O.A.P. | 0.4 mol/liter 2000 ppm | 90 – 96 | >600 |
| 7 | $Na_2S_2O_3$ O.A.P. | 0.4 mol/liter 5000 ppm | 90 – 97 | >600 |
| 8 | $Na_2S_2O_3$ O.A.P. | 0.1 mol/liter 2000 ppm | 90 – 93 | >600 |
| 9 | $(NH_4)_2SO_3$ diethylenediamine*² | 0.4 mol/liter 2000 ppm | 90 – 92 | >420 |
| 10 | $Na_2S$ T.N.P.*³ | 0.4 mol/liter 2000 ppm | 90 – 94 | >600 |

*¹O.A.P.: o-aminophenol

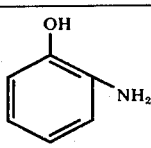

*²$H_2NCH_2CH_2NHCH_2CH_2NH_2$

*³T.N.P.: trinitrophenol

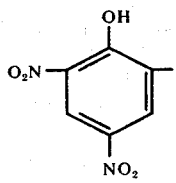

The advantages of the present process for removing nitrogen oxides from waste gases are (1) a high denitrogenation rate can be obtained and (2) the life of the aqueous scrubbing solution is remarkably long. Accordingly, the present process can be advantageously applied to waste gases having a high concentration of nitrogen oxide and/or a high concentration of oxygen, such as waste gas from sintering furnaces, waste gas from metal dissolving and pickling plants and the like.

The present invention is illustrated by, but by no means limited to, the following examples.

EXAMPLE 1

100,000 Nm³/Hr of flue gas from a heavy-oil burning boiler containing about 200 ppm by volume of $NO_x$ was denitrogenated, after removing sulfur oxides from the flue gas, in accordance with the following procedure.

100 ppm by volume of $ClO_2$ obtained from a conventional chlorine dioxide generator was added into the flue gas, and the waste gas was then continuously fed to the bottom of a scrubbing column comprising three Moredana plates (a perforated plate without weir and downcomer) having a free-space ratio (plate opening area/plate cross-sectional area) of 0.35 and a hole diameter of 8 mm, wherein the flue gas was brought into countercurrent contact with a circulating aqueous scrubbing solution having the composition given below. The superficial gas velocity in the column was 3.5 m/sec and the liquid-gas ratio (L/G) in said column was 3.

| Composition of the Scrubbing Solution | |
|---|---|
| Component | g/liter |
| $Na_2S_2O_3$ | 10 |
| $Na_2SO_4$ | 40 |
| $Na_2S_4O_6$ | 150 |
| NaCl | 52 |
| $NaNO_3$ | 72 |
| o-aminophenol | 2 |

Make-up amounts of $Na_2S_2O_3$ and o-aminophenol were below 98.6 kg/Hr and 1 kg/Hr, respectively.

The $NO_x$ content in the off-gas from the scrubbing column was NO of 0 ppm and $NO_2$ of less than 10 ppm, and the operation having a stable denitrogenation rate could be maintained.

EXAMPLE 2

100,000 Nm³/Hr of flue gas from a heavy oil burning boiler containing about 200 ppm by volume of $NO_x$ was denitrogenated, after removing sulfur oxides from said flue gas, in the same procedure as in Example 1, except that a circulating aqueous scrubbing solution having the following composition was used.

| Composition of the Scrubbing Solution | |
|---|---|
| Component | g/liter |
| $Na_2S$ | 2.5 |
| $Na_2S_2O_3$ | 11 |
| $Na_2S_4O_6$ | 180 |
| $Na_2SO_4$ | 20 |
| NaCl | 51 |
| $NaNO_3$ | 65 |
| T.N.P. | 2 |

The make-up amounts of $Na_2S$, $Na_2S_2O_3$ and T.N.P. (trinitrophenol) were under 10 kg/Hr, 90 kg/Hr and 1 kg/Hr, respectively.

The $NO_x$ content in the off-gas from the column was NO of 0 ppm and $NO_2$ of 7 ppm, respectively, and the stable operation having an approximately constant rate of denitrogenation could be maintained.

EXAMPLE 3

100,000 Nm³/Hr of waste gas from a heating furnace containing about 200 ppm by volume of $NO_x$ was continuously denitrogenated by first adding 100 ppm by volume of $ClO_2$ obtained from a conventional chlorine dioxide generator into the waste gas and then by bringing the gas into countercurrent contact with a circulating aqueous scrubbing solution having the following composition, in the scrubbing column used in Example 1.

| Composition of the Scrubbing Solution | |
|---|---|
| Component | g/liter |
| $Na_2SO_3$ | 12 |
| $Na_2SO_4$ | 112 |
| NaCl | 50.5 |
| $NaNO_3$ | 74 |
| triethylenediamine | 2 |

The make-up amounts of $Na_2SO_3$ and triethylene diamine were below 80 kg/Hr and 1 kg/Hr, respectively.

The $NO_x$ content in the off-gas from the scrubbing column was NO of 0 ppm and $NO_2$ of less than 20 ppm, respectively, and the stable operation having a substantially constant rate of denitrogenation could be maintained.

EXAMPLE 4

Example 1 was repeated except that 200 ppm of $O_3$ was used instead of $ClO_2$.

The $NO_x$ content in the off-gas from the scrubbing column was NO of 0 ppm and $NO_2$ of less than 10 ppm, and a stable operation having a substantially constant denitrogenation rate could be maintained.

EXAMPLE 5

Example 1 was repeated except that a circulating aqueous scrubbing solution having the follow composition was used.

| Composition of the Scrubbing Solution | |
|---|---|
| Component | g/liter |
| $(NH_4)_2SO_3$ | 11 |
| $(NH_4)_2SO_4$ | 104 |
| $NH_4Cl$ | 46 |
| $NH_4NO_3$ | 70 |
| triaminophenol | 2 |

The $NO_x$ content in the off-gas from the scrubbing column was NO of 0 ppm and $NO_2$ of less than 20 ppm, and a stable operation having a substantially constant denitrogenation rate could be maintained.

EXAMPLE 6

Example 1 was repeated except that a circulating aqueous scrubbing solution having the following composition was used.

| Composition of the Scrubbing Solution | |
|---|---|
| Component | g/liter |
| $Na_2S_2O_4$ | 13 |
| NaOH | 3 |
| $Na_2SO_4$ | 68 |
| $Na_2S_4O_6$ | 24 |
| NaCl | 52 |
| $NaNO_3$ | 72 |
| triaminophenol | 2 |

The $NO_x$ content in the off-gas from the scrubbing column was NO of 0 ppm and $NO_2$ of less than 20 ppm, and a stable operation having a substantially constant denitrogenation rate could be maintained.

EXAMPLE 7

Example 1 was repeated except that a circulating aqueous scrubbing solution having the following composition was used.

| Composition of the Scrubbing Solution | |
|---|---|
| Component | g/liter |
| NaHS | 5.4 |
| S | 4.5 |
| NaCl | 26 |
| $NaNO_3$ | 36 |
| triaminophenol | 2 |

The $NO_x$ content in off-gas from the scrubbing column was NO of 0 ppm and $NO_2$ of less than 20 ppm, and a stable operation having a substantially constant denitrogenation rate could be maintained.

What we claim is:

1. A process for removing nitrogen oxides including nitrogen monoxide and nitrogen dioxide from a waste gas substantially free of sulfur oxides comprising the steps of:
   a. oxidizing the nitrogen monoxide to the nitrogen dioxide by adding a gaseous oxidizing agent to the waste gas, and
   b. scrubbing the waste gas with an aqueous scrubbing solution to reduce a nitrogen oxides to nitrogen consisting essentially of:
   i. at least 0.5% by weight of at least one sulfur-containing reducing compound selected from the group consisting of sulfites, thiosulfates, sulfides, polysulfides, hydrosulfites and hydrosulfides of alkali metals or ammonium, and
   ii. at least 500 ppm by weight of at least one catalytic compound selected from the group consisting of (a) amino compounds having the general formula $R(NH_2)_n$, wherein R represents substituted or unsubstituted hydrocarbon radicals, said substituent being one or more oxygen-, sulfur-, or nitrogen-containing hetero radicls, and $n$ represents a positive integer, (b) nitro compounds having the general formula $R(NO_2)_n$, wherein R represents substituted or unsubstituted hydrocarbon radicals, said substituent being one or more oxygen-, sulfur- or nitrogen-containing hetero radicals and $n$ represents a positive integer and (c) nitroso compounds and hydroxylamino compounds produced by the reduction reaction of said nitro compounds or the oxidation reaction of said amino compounds.

2. The process as claimed in claim 1, wherein said oxidizing agent is chlorine dioxide or ozone.

3. The process as claimed in claim 2, wherein the mole ratio of said chlorine dioxide to nitrogen monoxide is approximately 0.5.

4. The process as claimed in claim 2, wherein the mole ratio of said ozone to nitrogen monoxide is within the range from about 1.0 to about 1.5.

5. The process as claimed in claim 1, wherein the concentration of said sulfur-containing reducing compound in the scrubbing solution is in the range from 1 to 5% by weight based on the total weight of the scrubbing solution.

6. The process as claimed in claim 1, wherein said hydrocarbon radicals contain carbon atoms from 1 to 20.

7. The process as claimed in claim 1, wherein the concentration of said catalytic compound in the scrubbing solution is in the range from 1000 to 5000 ppm by weight based on the total weight of the scrubbing solution.

8. The process as claimed in claim 1, wherein the amino compounds are selected from the group consisting of methylamine, dimethylamine, trimethylamine, o-aminophenol, p-aminophenol, dinitroaniline, diethylenediamine, triaminophenol and cyclohexylamine.

9. The process as claimed in claim 1, wherein the nitro compounds are selected from the group consisting of nitroglycerin, o-nitrotoluene and trinitrophenol.

10. The process as claimed in claim 1, wherein the nitroso compounds are selected from the group consisting of dinitro nitrosophenol, p-nitrosol phenol, 2-nitroso-1,3-propanediol.

11. The process as claimed in claim 1, wherein the hydroxylamino compounds are selected from the group consisting of dinitrohydroxyl aminophenol, phenylhydroxylamine, 2-hydroxylamino-1,3-propanediol.

* * * * *